Nov. 24, 1970 M. D. PENNINGS 3,541,675
SEMICONDUCTOR CIRCUIT CHIP SUPPORT APPARATUS
AND WELDING CHUCK THEREFOR
Filed March 7, 1968 2 Sheets-Sheet 1

INVENTOR.
MATHEUS D. PENNINGS
BY a.c. Smith
ATTORNEY

United States Patent Office 3,541,675
Patented Nov. 24, 1970

3,541,675
SEMICONDUCTOR CIRCUIT CHIP SUP-
PORT APPARATUS AND WELDING
CHUCK THEREFOR
Matheus D. Pennings, Los Altos Hills, Calif., assignor to
Engineered Machine Builders Co., Inc., a corporation
of California
Filed Mar. 7, 1968, Ser. No. 711,405
Int. Cl. H01j 17/00
U.S. Cl. 29—569                                    9 Claims

ABSTRACT OF THE DISCLOSURE

A frame of integrated circuit electrode patterns is supported during fabrication between upper and lower plates with spring fingers holding the individual electrodes of an electrode pattern in fixed position during welding. A mating chuck provides longitudinal positioning of the frame and plates for selecting individual electrode patterns and also provides orthogonal and angular positioning of the frame and plates to facilitate ultrasonic welding of connecting wires between circuit terminals of an integrated circuit chip and selected electrodes in an electrode pattern in the frame.

BACKGROUND OF THE INVENTION

Certain known mounting structures used in welding connecting wires between circuit terminals of a semiconductor device and a suitable supporting electrode structure or header include mounting a plurality of the semiconductor bodies, each attached to a header, in longitudinal alignment and in corresponding angular positions along a mounting jig or frame. Welds to corresponding targets may thus all be performed on the semiconductor bodies and headers one after another using a single angular setting of the support for the frame or jig relative to the welding tip. Structures of this type are described in the literature (see, for example, U.S. Patent application Ser. No. 629,504 entitled Wire Bonder and Method, filed by Matheus D. Pennings on Apr. 10, 1967) and now issued to U.S. Pat. No. 3,444,612. One disadvantage encountered using mounting structures of this type to support the planar-type electrode patterns or headers commonly used with integrated circuit and transistor and diode chips is that the individual planar electrodes are usually not held securely during ultrasonic welding. Vibration of such unsecured electrodes during formation of the weld produces a poorly welded joint that is highly susceptible to failure. Also, a frame rotating mechanism is usually not provided for rotating the frame to angularly position each workpiece separately with reference to the welding tip. Thus, additional handling during many passes of a conventional frame past the welding tip may be required to form the necessary connections on each of a group of workpieces.

SUMMARY OF THE INVENTION

Accordingly, the workpiece mount of the present invention includes a plurality of individual spring fingers which engage the planar-type electrodes in an electrode pattern and secure them firmly against a backing plate during the ultrasonic welding of connections thereto. The electrode patterns are regularly spaced along the length of the workpiece mount and the site of each workpiece along the length of the present mount is identified for automatic indexing beneath a welding tip.

A mating chuck for the present workpiece mount provides both the indexing of individual workpieces and the angular and orthogonal positioning of a welding target on an individual workpiece with reference to a welding tip.

DESCRIPTION OF THE PREFERRED EMBODIMENT

Figure 1:
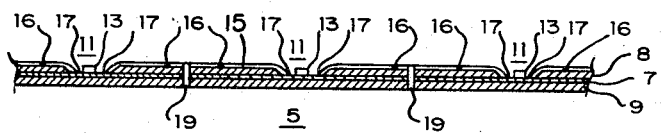
FIG. 1 is a side-sctional view of the workpiece mount according to the present invention showing the spring fingers arranged to urge the electrodes securely against the backing plate.

Referring now to the figures of the drawing and particularly to the sectional view of FIG. 1, there is shown a workpiece mount 5 comprising a frame 7 of planar-type electrode patterns disposed between upper plate 8 and lower plate 9. The upper plate 8 has a plurality of countersunk holes 11 therethrough at regularly spaced intervals through which an individual electrode pattern of frame 7 and its corresponding semiconductor circuit chip 13 is exposed. The semiconductor circuit chips 13, which were previously bonded to the frame 7 by conventional means, commonly have a plurality of circuit terminals which are to be connected by ultrasonically welding lengths of connecting wire to selected electrodes in the electrode patterns of frame 7. In order to secure the electrodes in a given pattern in frame 7 against translational movement during ultrasonic welding thereto of an end of a connecting wire 20, a spring plate 15 is attached to the upper plate 8, for example by spot welding 16, with its integral spring fingers 17 protruding into the countersunk holes 11 or work sites and contacting the upper surfaces of the electrodes of frame 7 to urge the electrodes against the lower plate 9. Alternatively, the lower plate may be provided at each work site or hole 11 by the upper end of the plunger rod 45 of FIG. 3. Alignment pins 19 retain the upper plate 8, the frame 7 of electrode patterns 7 and the lower plate 9 in accurate alignment so that individual spring fingers 17 engage individual electrodes through the holes 11. Thus, the spring fingers 17 retain the electrodes in frame 7 securely in position against the lower plate during the welding of connecting leads thereto in the apparatus of FIGS. 2 and 3. At least one of the upper and lower plates 8, 9, includes a rack gear 21 along one edge and a plurality of indexing notches 23 along the opposite edge, as shown in FIG. 2.

Figure 2:
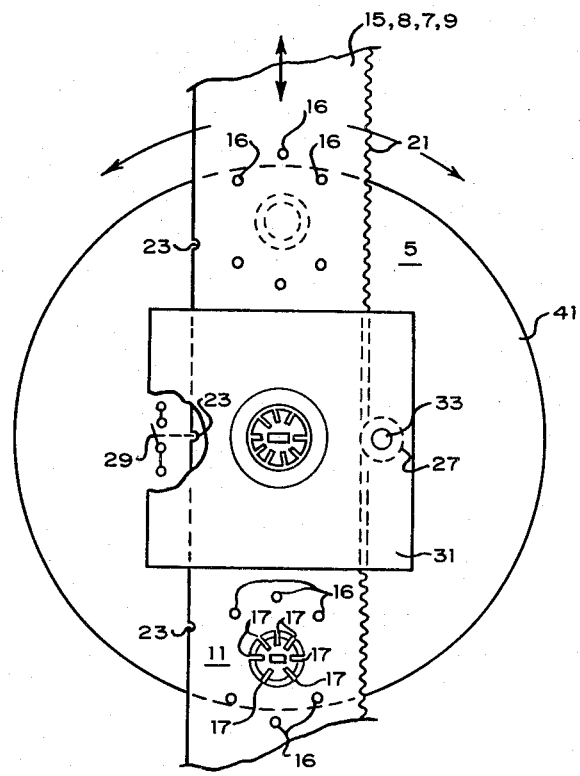
FIG. 2 is a top view of the workpiece mount of FIG. 1 showing the operational engagement thereof with the mating welding chuck therefor.
Figure 3:
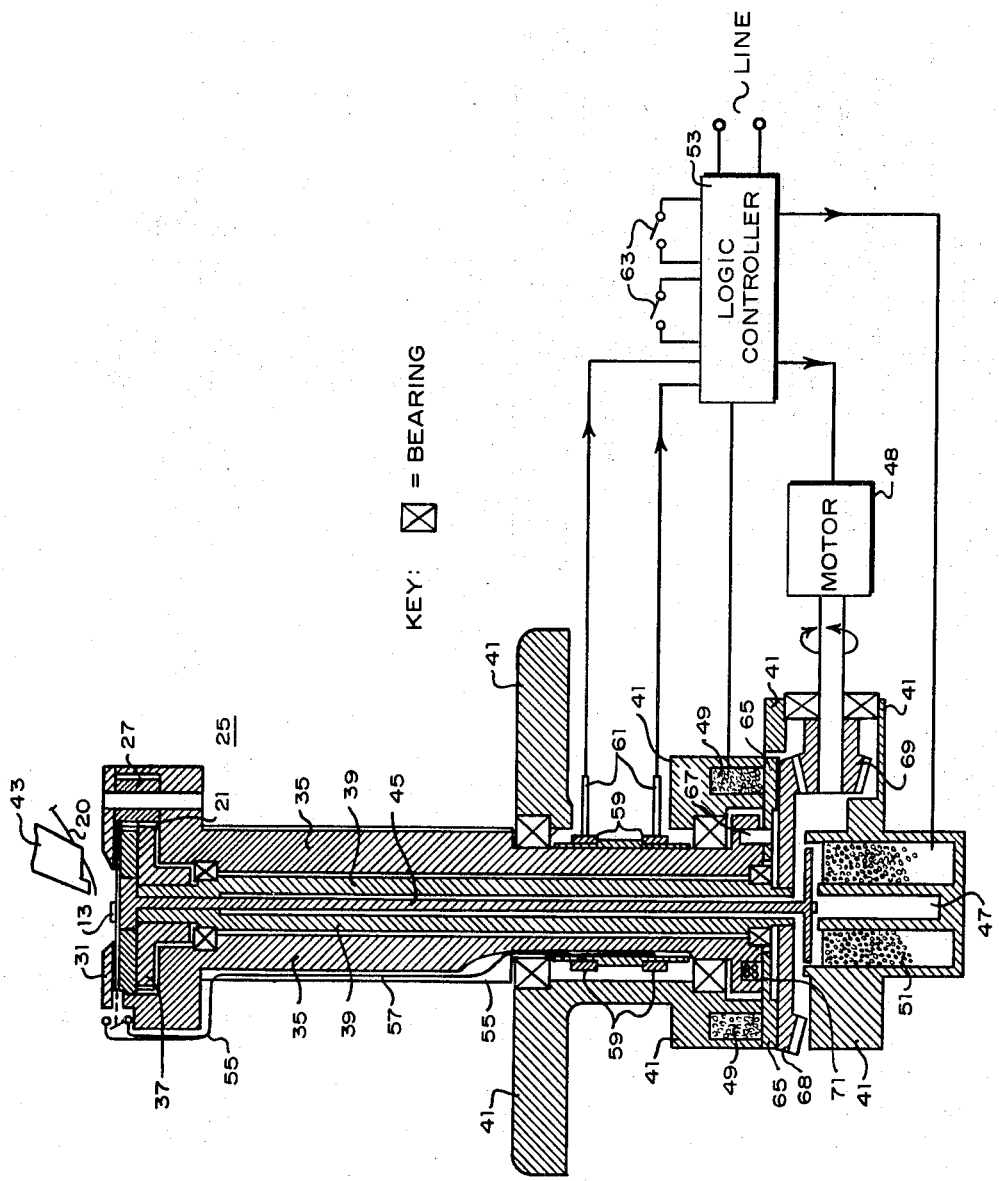
FIG. 3 is a side sectional view of the welding chuck of FIG. 2 showing the indexing and angular positioning apparatus.

Referring now to FIGS. 2 and 3, the workpiece mount 5 of laminated construction, as shown in FIG. 1, is shown slidably supported in the chuck 25 with the rack gear 21 engaged with the pinion gear 27 of the chuck 25. A switch 29 is mounted on the chuck 25 near the opposite edge of the workpiece mount 5 and is mechanically linked thereto by suitable means to be actuated by the indexing notches 23. The pinion gear 27 is rotatable about its shaft 33 which is attached to the outer housing 35 and cover plate 31 and is rotated to advance the workpiece mount 5 through the chuck in response to rotation of the gear 37 meshed with pinion gear 27. The gear 37 is attached to a hollow shaft 39 which is rotatably mounted within the outer housing 35 which, in turn, is rotatably mounted in the base 41. Thus, rotation of the hollow shaft 39 with reference to the outer housing 35 rotates the pinion gear 27 to position the workpiece mount 5 longitudinally in the chuck 25 and rotation of the outer housing 35 alters the angular position of the workpiece mount 5 and chuck 25 with respect to the welding tip 43. Of course, other suitable cog means such as a conventional ratchet and pawl arrangement may also be used to advance the workpiece mount 5 through the chuck 25 in response to rotation of the shaft 39. A plunger rod 45 is disposed within the hollow shaft 39 to bear against the lower side of the workpiece mount with a force produced by the spring 47 disposed at its lower end. This force on the underside of the mount assures that the electrodes in the frame 7 are tightly held against the spring fingers 17 and also that the mount is securely held in position against the upper plate 31 of the chuck 25.

The outer housing 35, inner shaft 39, and plunger rod 45 are rotated and actuated by the motor 48 and electromagnetic actuators 49 and 51 which are controlled by the logic controller 53. The logic controller 53 is connected to the indexing switch 29 through wires 55 which run in a slot 57 along the outer housing 35 to a pair of slip rings 59 and brushes 61 and is also connected to suitable switches 63 which may control the angular position of the chuck 25 with respect to the welding tip and the advance of the workpiece mount through the chuck 25, and the like.

In operation, the workpiece mount 5 may be advanced through the chuck 25 by actuating a switch 63 to cause logic controller 53 to energize motor 48 and electromagnetic actuators 49 and 51. Actuator 51 pulls the plunger rod 45 down away from the underside of mount 5, thereby unlocking the mount 5 to permit easy indexing through the chuck 25. Actuator 49 attached to the base 41 draws the clutch plate 65 into rigid engagement with the base 41, thereby preventing the clutch plate 65 from rotating. The outer housing 35 is coupled to the clutch plate 65 through pin 67 so that the outer housing 35 and the chuck 25 supported thereon are rigidly coupled to the base 41 and are therefore not free to rotate. The motor 48 thus rotates the hollow shaft 39 with respect to the outer housing 35 through the bevel gear 68 attached to the shaft 39 and the meshed driving gear 69 attached to the motor shaft. Shaft 39 turns the gear 37 at the upper end which, in turn, rotates pinion gear 27 meshed with the rack gear 21 on the mount 5 to advance the mount 5 within the chuck 25. This operation continues until indexing switch 29 is actuated by a notch 23 adjacent a new work station on mount 5. This actuates the logic controller 53 to deenergize the motor 48 and actuators 49 and 51. Spring 47 thus forces plunger rod 47 upward to lock the mount 5 in the new position and the clutch plate 65 disengages the base portion 41. Resilient means 71 urges the clutch plate 65 into engagement with the top of bevel gear 68 so that the outer housing 35 which is coupled to the clutch plate 65 through pin 67 and the hollow shaft 39 which is attached to the bevel gear 68 all rotate together. Thus, actuation of switch 63 causes motor 48 to rotate the chuck 25 and workpiece mount 5 with respect to the welding tip 43. It should be noted that since gear 37 attached to the upper end of shaft 39 rotates with the outer housing 35, pinion gear 27 does not rotate to advance the mount 5 through the chuck 25. Base 41 may be mounted on the frame of a welding machine and may be coupled to a positioning knob using conventional pantographic linkage for fine orthogonal positioning of chuck 25 and mount 5 beneath the welding tip 43.

Therefore, the present mount for a frame of electrode patterns secures the electrodes in position for ultrasonic welding of connecting wires thereto. Also, the mating chuck according to the present invention provides orthogonal and angular positioning of the workpieces at the work sites and also provides automatic advancing and indexing of the present mount using a pair of electromagnetic actuators and a single drive motor.

I claim:
1. Mounting apparatus to support a generally planar, relatively flexible electrode pattern for a semiconductor device, the apparatus comprising:
   a substantially rigid upper plate having an aperture therein for exposing therethrough a selected region of an electrode pattern for a semiconductor device disposed on the underside of said upper plate;
   means coupled to said upper plate for retaining said selected region of an electrode pattern in fixed positional alignment with said aperature; and
   at least one resiliently biased finger supported on the upper plate and disposed within said aperture to engage an electrode of an electrode pattern for a semiconductor device to urge such electrode in a direction away from said upper plate.
2. Apparatus as in claim 1 comprising:
   backing means disposed on the side of an electrode pattern for a semiconductor device remote from the upper plate for urging an electrode of said pattern against said resiliently-biased finger.
3. Apparatus as in claim 2 wherein:
   said backing means includes a lower plate; and
   means coupling said upper and lower plates for retaining the same in fixed positional alignment.
4. Apparatus as in claim 3 wherein:
   said upper plate has an elongated shape and includes a plurality of apertures positioned at regular intervals along the length of said upper plate for exposing similar selected regions of a plurality of electrode patterns for semiconductor devices; and
   said upper plate includes cog means along the length thereof for advancing the upper plate and the electrode patterns positioning aligned therewith between said apertures.
5. A chuck to support an electrode pattern for a semiconductor device, the chuck comprising:
   an outer housing rotatably supported in a base;
   a cover plate supported on said outer housing and having an aperture therein for exposing a selected area of an electrode pattern for a semiconductor device disposed therebeneath;
   a plunger rod supported within said outer housing to move longitudinally therein and having an end disposed beneath the aperture in said cover plate to receive an electrode pattern for a semiconductor device between said end and said cover plate;
   actuator means coupled to said plunger rod for selectively urging said end in a direction toward the cover plate to secure an electrode pattern for a semiconductor device in fixed position on said outer housing; and
   means coupled to said outer housing for selectively rotating said outer housing with respect to said base.
6. A chuck as in claim 5 comprising:
   a shaft rotatably supported within the outer housing;
   cog means supported on said outer housing and responsive to rotation of said shaft for advancing an electrode pattern for a semiconductor device with respect to the aperture in said cover plate; and
   drive means coupled to said shaft for selectively rotating said shaft with respect to said outer housing.
7. A chuck as in claim 6 wherein:
   said shaft and said outer housing are coaxially supported;
   a clutch member is disposed to rotate with said outer housing and is actuatable between a first position of coupling to said base for rigidly positioning said outer housing with respect thereto and a second position of coupling to said shaft for rotating the outer housing with said shaft; and means for selectively actuating said clutch member between said first and second positions.

8. A chuck as in claim 6 comprising:

a first gear attached to said shaft near the end thereof adjacent the cover plate; and a second gear meshed with said first gear and supported on said outer housing near an edge of an electrode pattern for a semiconductor device to advance the same in response to rotation of said shaft with respect to the outer housing.

9. A chuck as in claim 6 wherein:

said plunger rod is coaxially supported within said shaft.

References Cited

UNITED STATES PATENTS

| | | | |
|---|---|---|---|
| 3,216,640 | 10/1965 | Szasz | 228—3 |
| 3,253,761 | 5/1966 | Baldwin, et al. | 228—49 |
| 3,384,283 | 5/1968 | Mims | 228—1 |
| 3,444,612 | 5/1969 | Pennings | 29—471.1 |
| 3,458,102 | 7/1969 | Zanger, et al. | 228—3 |

JOHN F. CAMPBELL, Primary Examiner

R. J. CRAIG, Assistant Examiner

U.S. Cl. X.R.

29—203, 471.1; 228—1, 3, 7